United States Patent [19]

Ellen et al.

[11] 3,781,867

[45] Dec. 25, 1973

[54] DIGITAL CONTROL APPARATUS

[75] Inventors: Leonard William Ellen, Northwood; Gordon Thomas Davies, Wallasey, both of England

[73] Assignee: Her Majesty's Postmaster General, London, England

[22] Filed: July 19, 1971

[21] Appl. No.: 164,000

Related U.S. Application Data

[63] Continuation of Ser. No. 785,689, Dec. 20, 1968, abandoned.

[30] Foreign Application Priority Data

Jan. 8, 1968 Great Britain .................... 44771/68

[52] U.S. Cl. .......................................... 340/347 AD
[51] Int. Cl. .......................................... H03k 13/02
[58] Field of Search .............. 340/347 AD, 347 NT, 340/347 C; 324/99, 111; 235/92 PL, 92 PE

[56] References Cited

UNITED STATES PATENTS

| | | | |
|---|---|---|---|
| 3,582,947 | 6/1971 | Harrison | 340/347 NT |
| 3,480,948 | 11/1969 | Lord | 340/347 NT |
| 3,281,828 | 10/1966 | Kaneko | 340/347 AD |
| 3,551,809 | 12/1970 | Dufour | 235/92 PL |
| 2,979,708 | 4/1961 | Jorgensen | 340/347 NT |
| 3,543,152 | 11/1970 | Nuderwander | 324/99 D |

*Primary Examiner*—Thomas A. Robinson
*Assistant Examiner*—Jeremiah Glassman
*Attorney*—Hall and Houghton

[57] ABSTRACT

Digital display apparatus having a source of electric pulses feeding a counter has an extra binary counting stage interposed between the source and the counter. The setting of the extra stage at the end of a counting period is used to vary very slightly the number of pulses received by the counter during a succeeding counting period.

5 Claims, 10 Drawing Figures

LEONARD W. ELLEN,
GORDON T. DAVIES,
INVENTOR

BY Hall & Houghton,
ATTORNEY

PATENTED DEC 25 1973 3,781,867

LEONARD W. ELLEN,
GORDON T. DAVIES,
INVENTOR

BY Hall & Houghton

ATTORNEY

LEONARD W. ELLEN,
GEORGE T. DAVIES,
INVENTOR

BY Hall & Houghton
ATTORNEY

| FORWARDS | | BINARY STAGES | | | | BACKWARDS | |
|---|---|---|---|---|---|---|---|
| DECIMAL | JUMPS DUE TO fb | 4th | 3rd | 2nd | 1st | JUMPS DUE TO fb | DECIMAL |
| 0 | | 0 | 0 | 0 | 0 | | 0 |
| 1 | | 0 | 0 | 0 | 1 | | 1 |
| 2 | | 0 | 0 | 1 | 0 | | 2 |
| 3 | | 0 | 0 | 1 | 1 | | 3 |
| | ↓ | 0 | 1 | 0 | 0 | ↑ | 4 |
| 4 | | 0 | 1 | 1 | 1 | | |
| 5 | | 1 | 0 | 0 | 0 | | 5 |
| 6 | | 1 | 0 | 0 | 1 | | 6 |
| 7 | | 1 | 0 | 1 | 0 | | 7 |
| 8 | | 1 | 0 | 1 | 1 | | 8 |
| | ↓ | 1 | 1 | 0 | 0 | ↑ | 9 |
| 9 | | 1 | 1 | 1 | 1 | | |
| 0 | | 0 | 0 | 0 | 0 | | 0 |

SEQUENCE TABLE

SWITCHED GAIN AMPLIFIER

LEONARD W. ELLEN
GORDON T. DAVIES,
INVENTOR

BY Hall & Houghton

ATTORNEY

LEONARD W. ELLEN,
GORDON T. DAVIES,
INVENTOR

BY [signature]

ATTORNEY

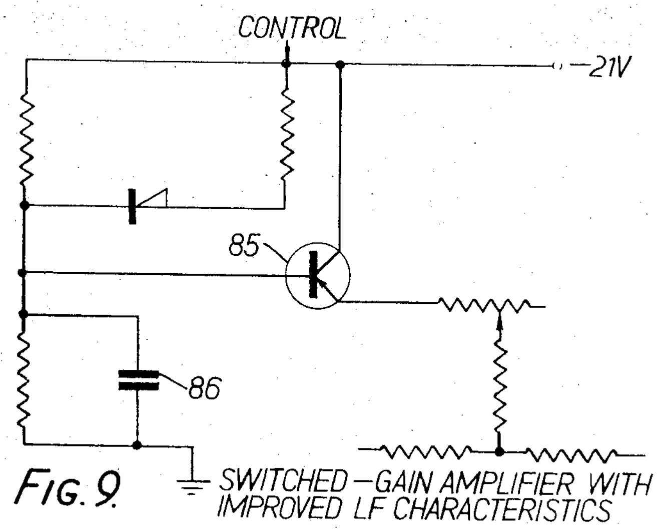
FIG. 9 SWITCHED-GAIN AMPLIFIER WITH IMPROVED LF CHARACTERISTICS
FROM COLLECTORS OF COUNTERS
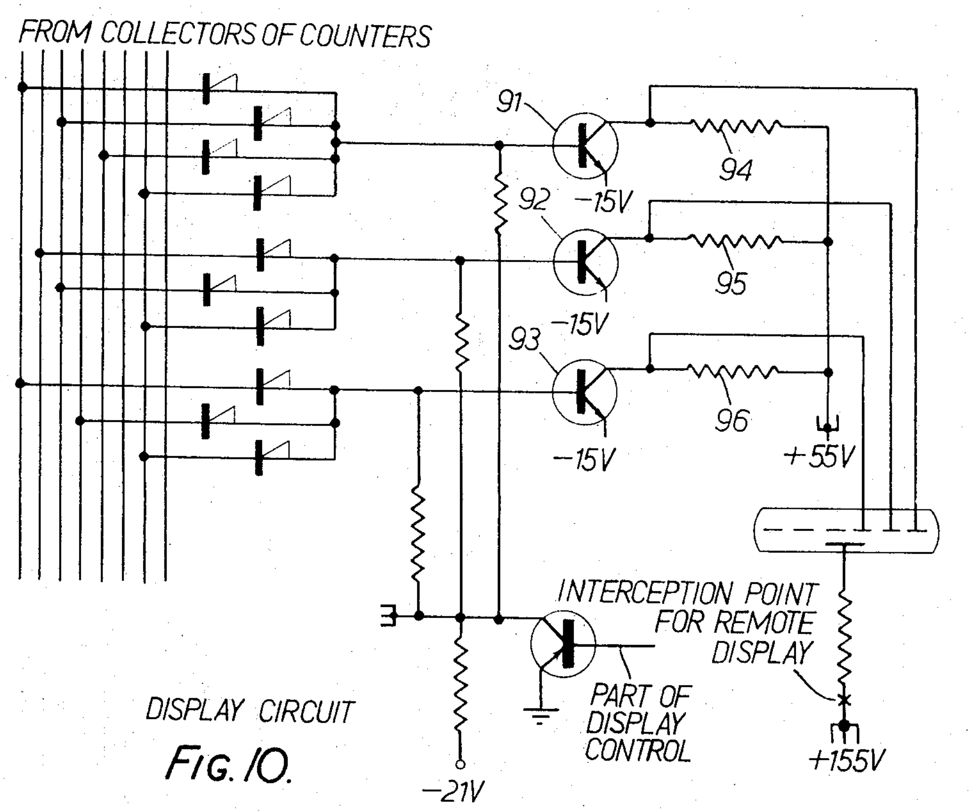
DISPLAY CIRCUIT
FIG. 10.
LEONARD W. ELLEN,
GORDON T. DAVIES,
INVENTOR
BY Hall & Houghton
ATTORNEY

DIGITAL CONTROL APPARATUS

CROSS-REFERENCE TO RELATED APPLICATION

This application is a continuation of application Ser. No. 785,689 filed Dec. 20, 1968, and now abandoned.

BACKGROUND OF THE INVENTION

This invention relates to digital display apparatus that is to say apparatus for displaying in digital form the measured value of a quantity.

It is well known that the digital value displayed is liable to random variation in the least significant digit of the displayed value, usually to the extent of one unit only, due to noise and/or small random changes in the value of the quantity being measured and/or in the value of a standard value with which the value of the quantity is compared. When the variation is between the digits "9" and "0" a carry to the next order digit is involved and the variation may be seen in two or more of the displayed digits. In the hands of a skilled user the variation does not usually lead to difficulties but when the apparatus is used by a relatively unskilled person the variation may result in serious reading errors but in any event tends to destroy the user's confidence in the apparatus. For example, alternations between displayed values of 9.9 and 10.0, particularly if the alternations are at all rapid could result in a display being recorded by a user as 9.0, 9.9, 10.9 or possibly 19.9. Such ambiguity is clearly undesirable and one of the objects of the present invention is the prevention of such alternation or its reduction to a point where it ceases to give rise to ambiguity.

SUMMARY OF THE INVENTION

The present invention provides a device for determining the value of a quantity and visually displacing the value in digital form comprising in combination a source of time-spaced electric pulses, a counter for receiving pulses from said source and counting the received pulses, means for controlling the number of pulses received by the counter in accordance with the value, visual display apparatus connected to the counter for displaying the value in digital form in accordance with the setting of the counter when the latter has counted said number of pulses, and, a further counting stage connected to said source and to said means for altering slightly the number of pulses received by said counter in accordance with the setting of said stage.

The additional counting stage may be a binary stage.

Where the value of the characteristic to be measured of an unknown signal is compared with a known value, the output of the additional counting stage may be used to increase or decrease slightly the known value or the value to be measured.

The output of the additional counting stage is not normally displayed visually.

The invention also provides a decibelmeter in which the level of an unknown signal is compared with an exponentially varying standard. The standard is derived from an RC combination of which the capacitor is charged to a known voltage and then allowed to discharge. At the commencement of discharge, an oscillator commences to drive a counting chain and is stopped when the exponentially decaying standard has fallen to the level of the unknown. The number of pulses counted provides an indication of the unknown level relative to the known level and by suitable choice of the RC parameter and frequency of oscillation of the oscillator a direct indication can be provided.

The range through which the standard decays is limited to part only of the theoretical range in the interests of accuracy and stability. In order to extend the effective range of the apparatus the latter has amplifiers with circuits for bringing the amplifiers into use or adjusting their gain as required. Preferably, a control circuit is provided for enabling an automatic searching action to be instituted when an unknown signal is applied to the apparatus in order to establish a required degree of amplification of the input signal.

A series of amplifiers is provided, the amplifiers being switched into use by a number of binary stages operated by control pulses supplied by the counting stage of the apparatus when a predetermined count is reached.

BRIEF DESCRIPTION OF THE DRAWINGS

FIG. 9 is the circuit diagram of an alternative form of the part shown in FIG. 8.

DESCRIPTION OF PREFERRED EMBODIMENTS

Digital measuring instruments are of two main types a. Analogue-to-digital converters, for example, digital voltmeters, in which an input is measured and the measured value converted to digital form for display purposes, and, b. Digital/digital comparators, for example frequency meters, where two digital counts are compared.

In some instruments of type (*a*) an oscillator driving a chain of pulse counters is controlled to drive the counters for a period of time which depends upon the quantity to be measured. The counters are set to zero and the count over the stated period of time gives the desired measurement.

In instruments of type (*b*), two counting chains are provided, one of which is driven by an oscillator of a known frequency while the other of which is driven by the signal whose frequency is to be determined. It is usually arranged that one of the oscillators is used to control the other oscillator to allow it to drive the counters of its chain for a known interval of time as determined by the count of the chain of the one oscillator during which the number of cycles of the other oscillator is counted by the chain.

In both cases, the requisite control may be exercised via a gating circuit although this is not essential.

As is well known, the counting chain may be simply several tandem connected binary devices with appropriate feedback so that the counter output can be displayed in decimal digit form. If the counting chain is preceded by an extra binary stage which is driven for a period which is twice as long as previously, a signal can be obtained which is not displayed but is used to change slightly the period during which the counting chain is driven. If, for example, the counting chain is driven via an "AND" gate, the signal controls the duration of opening of the gate. The extent by which the duration of opening is changed is small compared with the variation needed to change the displayed indication by unity, while the sign of the extent is determined by the state of the extra binary stage at the commencement of a counting period. The change in duration of opening of the gate is equivalent to a deliberate error but the magnitude of the change is much less than the overall accuracy of the apparatus and can therefore be ignored. The duration of opening of the gate is increased slightly if the extra binary stage is in the "0" state at the start of a count whilst the duration of opening is decreased slightly if the extra binary stage is in the "1" state at the start of a count.

Figure 1:
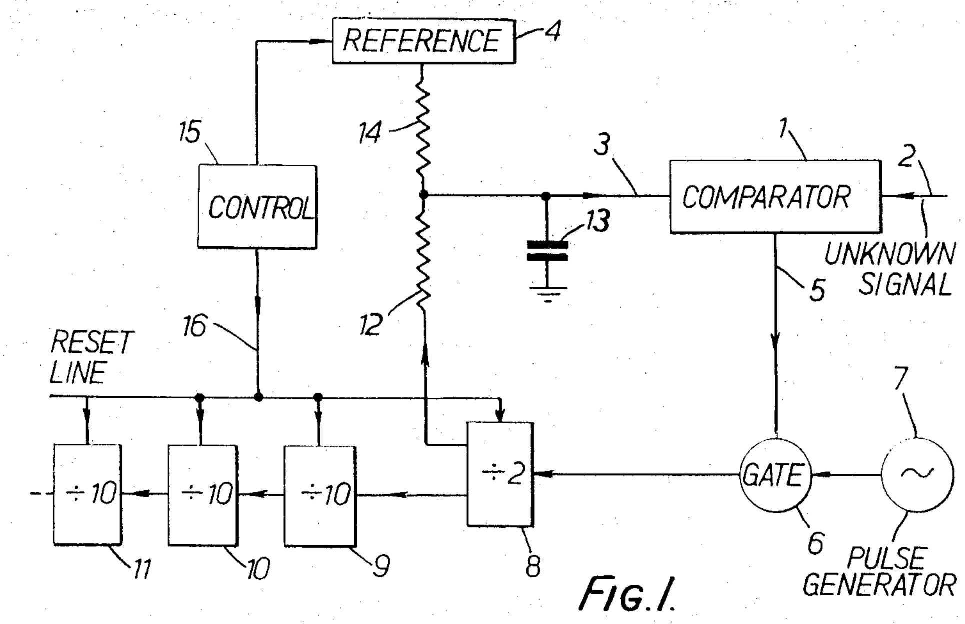
FIG. 1 is a block schematic of part of a first embodiment.

The effect of the extra binary stage is that if, for example the value of a quantity is 1234.0 (where the figure O represents the setting of the extra binary stage and is not displayed), the next reading will be slightly biased towards 1234.1. Thus, a small random change in conditions which might otherwise cause the displayed value to drop to 1233 is of no effect. Similarly, a random change tending to produce the value 1234.1 will simply hold the displayed value at 1234. If, on the other hand, the first measurement is 1234.1 (where the figure 1 is the setting of the extra binary stage and is not displayed), the next reading will be biased towards 1234.0, although not to an extent sufficient to result in a small random change causing the displayed value to drop to 1233. A small random change otherwise causing the displayed value to jump to 1234.1 will simply hold the displayed value at 1234. Thus, it will be appreciated that where the measured value falls between two displayable digital values, the extra binary stage decides arbitrarily which value will be displayed and maintains that condition despite the effect of small random changes.

Since the state of the extra binary stage changes while a count is in progress, it is necessary to provide a "memory" or storage so that the initial state of the extra binary stage at the start of a count can be recorded. The memory may be a capacitor of capacitance C. If the time taken to make a measurement is $t$ and is small compared with the time interval T before the next measurement, then the capacitor may be connected to the extra binary stage via a resistor of resistance R such that $t \ll RC \ll T$. If $t$ is not small compared with T, it will be necessary to arrange to charge or discharge the capacitor rapidly during T or to use some other form of store, for example another binary stage.

In instruments of type ($a$), the state of the store can be used to vary slightly either a standard value against which the unknown value to be measured is compared or the unknown value itself. If the store is a capacitor it may be the same capacitor as is used to present one of those values to a comparison circuit. Such an arrangement is shown in block schematic form in FIG. 1.

A comparison circuit 1 receives a first input on lead 2 which is the unknown to be measured and a second input on lead 3 derived from a reference source 4. The output 5 of the comparator 1 controls the duration of opening of a gate 6 which, when open, connects the output of an oscillator 7 to a binary trigger 8 — the extra binary stage mentioned above. One output of trigger 8 is fed to a chain of decade counters 9, 10 and 11. . . . whose number depends upon the number of digits to be displayed. The same or other output of trigger 8 dependent upon the conditions required passes via a resistor 12 of high resistance to a capacitance 13 both of which are connected as shown to the input lead 3 and via resistor 14 of low resistance to the reference source 4. The output of the control indicated by block 15 is used as at 16 to reset the chain of counters 9. . . .11 and the trigger 8, and via the reference source 4 to recharge the capacitor 13.

The nature of the reference source will depend upon the nature of the unknown to be measured. For example, if that unknown is a voltage, the source is a constant voltage source which might be obtained via a zener diode. Where it is desired to measure the power level of an unknown source relative to a known power level, the reference source might consist of a resistor-capacitor combination charged to a particular level and then allowed to discharge in the usual exponential manner.

Conveniently, each decade counter comprises four binary stages with feedback between the stages arranged in such manner that six of the possible 16 combinations of the four stages are eliminated. The output of the decade counters is fed to a visual display of any known suitable form, for example, an assembly of multiple-cathode, gas-filled tubes. The state of the trigger 8 is not displayed.

The embodiment of FIG. 1 operates generally in known manner. The output of the comparator opens the gate 6 for a period dependent upon the value of the unknown being measured to allow the output of the oscillator 7 to drive the chain of counters 9. . . .11. The voltage on capacitor 13 is controlled mainly by the voltage applied from the reference source 4 via resistor 14 but is also affected by the state of the trigger 8 to an extent depending upon the ratio of resistors 12 and 14. The variation of the voltage on capacitor 13 by the state of the trigger 8 produces the "biasing" described above.

It will be apparent that an equivalent variation could be effected by the state of the trigger 8 on the input applied to the comparator via lead 2.

Figure 2:
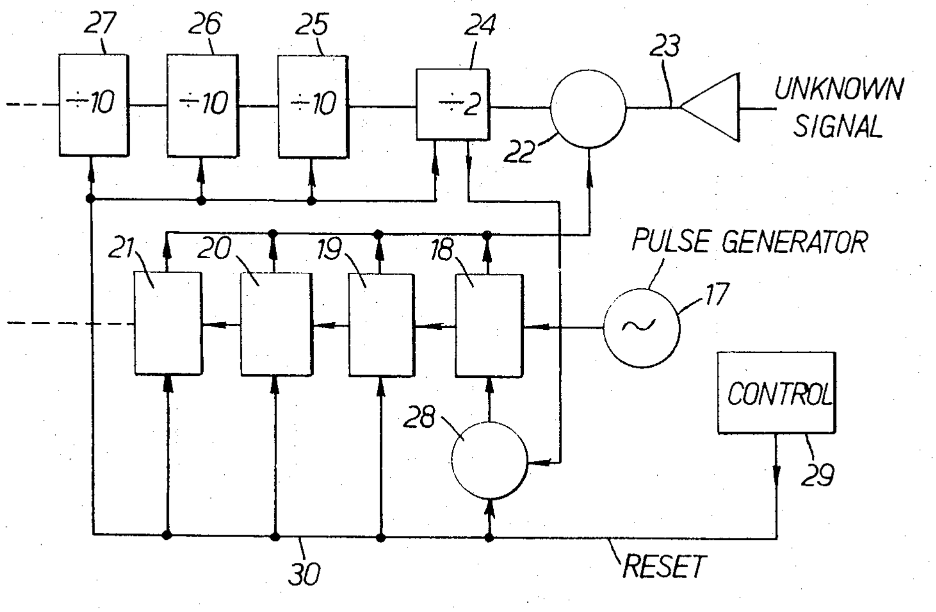
FIG. 2 is a block schematic of part of a second embodiment.

In instruments of type ($b$), the state of the store operates in a manner similar to that just described as will be evident from FIG. 2 which shows in block schematic form only a type ($b$) instrument embodying the invention and suitable for use as a frequency meter.

An oscillator 17 of a known reference frequency drives a chain of binary stages 18. . . . 21 whose outputs operate a gate 22 connecting an unknown frequency signal on a lead 23 to a binary stage 24 — the extra binary stage mentioned above. An output of binary stage 24 is applied to a chain of decade counters 25, 26 and 27 whilst the same or the other output of binary stage 24, dependent upon the conditions required, is used to effect slight variation of the duration of opening of the gate 22 by connecting the reset output 30 of control 29 via gate 28 to reset binary stage 18 to the 0 or 1 state.

The binary counters 18. . . .21 are set to count a predetermined number of pulses from oscillator 17 and to close gate 22 at the end of that count. Whilst gate 22 is open, pulses on lead 23 are passed via the extra binary stage into the decade counters whose output is displayed in some suitable manner. A signal from control 29 resets the chain of binary stages 18. . . .21 and counters 25. . . .27. Very short duration storage is required in gate 28 to allow for the fact that the extra binary stage 24 is reset at the same instant as the binary stages 18. . . .21.

The output of the extra binary stage in the embodiments shown in FIGS. 1 and 2 must of course be connected in the correct sense otherwise the effect of random variations will be worsened and not improved.

Figure 3:
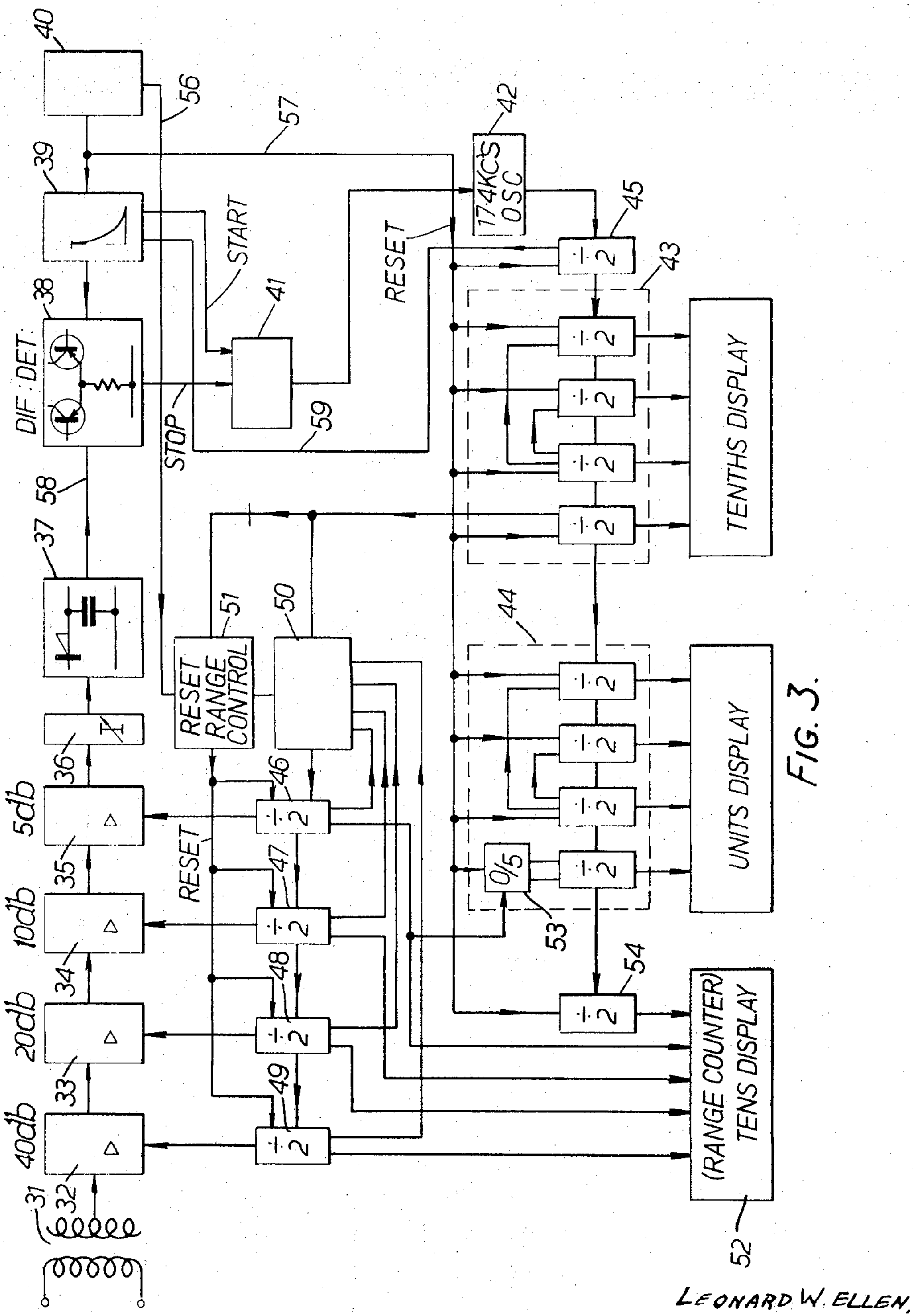
FIG. 3 is a block schematic of a third embodiment.

FIG. 3 shows in block schematic form a decibelmeter embodying the features set forth above. The meter employs a source of reference potential providing an exponentially-decaying output against which the level of the unknown signal to be measured is compared. The exponentially-decaying output is produced by a resistor capacitor network. When the capacitor of capacitance C charged to a voltage V1 is allowed to discharge through a resistor of resistance R, the voltage falls to a value V2 after time $t$ such that $$V2/V1 = e^{-t/RC}$$

thus, $\log_e V1/V2 = t/RC$
and $\log_{10} V1/V2 = 0.4343\ t/RC$
thus $20 \log_{10} V1/V2 = 8.686\ t/RC$
and V1/V2 decibels $= 8.686\ t/RC$ If RC is made equal to 10 milliseconds and $t$ is measured by counting the pulses of an oscillator of frequency 8.7 kc/s, the number of pulses counted is a direct measure of the relative power levels of V2 and V1 in tenths of a decibel. The range of such a reference source extends theoretically from 0 to $-\infty$ dbs, but practical considerations limit the upper voltage to which the capacitor can conveniently be charged and the lower voltage at which it may be compared accurately with an unknown signal. A ratio of 4:1 (=12 dbs) is possible but in the interests of accuracy and stability, it is preferred to operate over a ratio of about 2:1 (6 dbs).

For reasons which will become apparent later, an oscillator of frequency nominally 17.4 kc/s is employed, the output being divided by two by the extra binary stage. The actual frequency of the oscillator is set to take up any tolerance in the components giving the RC value of 10 milliseconds nominal, or alternatively the RC values may be adjusted.

Conveniently, the capacitor is charged about four times a second to a voltage of 5.5 volts controlled by a zener diode, the voltage being that at which such diodes have the least voltage variation with temperature changes. At the instant when the capacitor charging voltage is removed, the 17.4 kc/s oscillator is set to drive a counting chain. When the value of the exponentially decaying voltage equals the value of the unknown voltage the oscillator is stopped and the total count is displayed visually. During the counting, the display is seen to have a slight flicker, but this is psychologically desirable as suggesting to a user that the apparatus is not "stuck" on a particular reading.

As the practical range of the exponentially decaying voltage generator is limited, a practical apparatus must incorporate a number of amplifying stages and in the present embodiment four such stages are used whose gain can be switched by 5, 10, 20 and 40 dbs thus providing variation by 5 db steps over a range of 0–75 db. In addition, a further fixed gain amplifier is included followed by a voltage-doubler, full-wave rectifier in order to apply a d.c. signal of 5.5 volts to the comparator when the apparatus is fed with an input signal at a level of +20 db relative to one milliwatt with all the switched-gain amplifiers at minimum gain. With those amplifiers at maximum gain, an acceptable d.c. signal is obtained with an input signal of level about −61.4 db. Thus, sixteen ranges are available in 5 db steps, each range covering about 6 db and giving 1 db overlap to avoid hunting on marginal signals.

The switched-gain amplifiers are automatically controlled in a manner such that a measuring cycle with a searching action is provided to establish a level of amplification appropriate to an applied unknown signal. The tens digit display is also automatically controlled at the same time. The first stage of the tens counter also determines whether the units counter is reset to 0 or 5 at the beginning of a measuring cycle.

The tens counter is not reset at the end of each measuring cycle but remains steady so long as the input signal is within a 6 db range. If however an excessive count is recorded by the units counter (i.e. beyond the 6 db range), a single pulse is delivered to the tens counter and the gain of the amplifier is increased by 5 db. If the gain is still inadequate, an excessive count will occur again and a further 5 db gain will be added. This process continues until the signal is brought within range or maximum gain is reached. On the other hand, if the signal is too large, the count from the 17.4 kc/s oscillator will be zero and a reset pulse is delivered to the tens counter to set all the switched-gain amplifiers to minimum. Gain is then restored in 5 db steps using the searching action just described. During range changing, the display is extinguished to avoid any risk of an incorrect reading being taken and for psychological reasons. If the input signal is beyond the range of the apparatus in either direction, the display remains extinguished but a + or − sign is shown to indicate whether the input signal is too high or too low.

The number of pulses received by the tenths and units decade counters will always be greater for a lower level of signal within any one range. It is clear that for levels below 0 dbm (i.e. −ve levels) a lower level should give a greater reading, whereas for levels above 0 dbm (i.e. +ve levels) the opposite is true. It follows that the decade counters are required to count forwards for −ve levels and backwards for +ve levels. It is possible to achieve this by duplication of the display matrix, but in the present instrument it has been arranged to reverse the counters themselves.

A simple binary counter counts forwards or backwards according to which of the two outputs of a stage is used to drive the next stage. In forward binary counting the "carry" to the next stage occurs when a stage changes from 1 to 0 whereas for backwards counting the "carry" occurs on the change from 0 to 1. The tenths and units counters are therefore arranged to that the "carry" may be obtained from either side of each stage under the control of potentials applied to two control rails by a reversing toggle. This is a bistable pair which is set in one state or the other by the tens counter. The setting of the latter determines which range is in use and therefore determines the direction of counting required. One range straddles the zero and in this case it is necessary to reverse the counter as it passes through zero. The reversing circuit is therefore made sufficiently fast to operate well within one cycle of 8.7 kc/s. A multi-way gate detects the instant at which zero is reached on the tenths units and tens counters simultaneously and flips the reversing toggle so that the counters are reversed before the next counting pulse is received.

A signal to be measured is applied via an input transformer 31 to a series of switched-gain amplifiers 32. . . .35 providing amplification of 40 db, 20 db, 10 db and 5 db respectively and a further amplifier and attenuator 36 whose gain is adjusted to give a signal of appropriate level to a rectifier assembly 37. The d.c. output of assembly 37, suitably smoothed, is applied to one input of comparator or difference detector 38, the other input of which receives an exponentially varying voltage from a generator 39 which in turn receives an input from a low frequency multivibrator 40. At the instant that the output from generator 39 starts its exponential decay, a signal is passed via a start-stop control 41 causing a 17.4 kc/s oscillator 42 to start. When the exponentially decaying voltage from generator 39 applied to the right-hand input of comparator 38, equals the voltage of the signal applied to the left-hand input a signal is generated causing the 17.4 kc/s oscillator 42 to stop.

The low frequency multivibrator 40 which may operate at any convenient frequency for example 3 or 4 c/s causes the charging of a capacitor in generator 39. On cessation of this charging current the logarithmic decay commences and at the same instant a very short pulse is generated to reset a tenths counter 43 and a units counter 44. Immediately on cessation of this pulse the counters 43 and 44 start to count the pulses of the 17.4 kc/s oscillator 42 which drive the counters 43 via an extra binary stage 45. The discharge time of the generator 39 is arranged to be very short typically 10 milliseconds in comparison with repetition time of the generator 10 and the tenths counter 43 and units counter 44 therefore remain in a steady state for the majority of the time.

The tenths counter 43 and units counter 44 are connected through a suitable diode matrix and transistor circuits to give a visual display of the state of the counters. The display therefore appears to be virtually continuous, with a very slight flicker at the frequency of low frequency multivibrator 40.

Although extending theoretically to $-\infty$ as has been explained above, the practical range of the generator 39 is about 6 db. As the practical range of the generator 39 is restricted it is necessary to provide the amplifiers 32. . . .35 which are brought into use in the following manner to bring the input signal applied to transformer 31 within the range catered for by the comparator 38. If the count registered by tenths counter 33 and units counter 34 exceeds a given number (typically 64 counts, i.e. 6.4 db) a chain of four binary stages 46. . . .49 receives a single pulse from a pump circuit 50 which has counted the number of output pulses from the tenths counter 43. This single pulse, in stepping the binary stages 46. . . .49, will switch in appropriate ones of the amplifiers 32. . . .35 so as to increase the overall gain in steps of 5 db. If on the next measurement, approximately 0.25 seconds later, an excessive count is again recorded by counters 43 and 44 a further pulse is delivered to binary stages 46. . . .49 which switches amplifiers 32. . .35 so as to increase the gain by a further 5 db. This process continues until sufficient gain has been provided to bring the input signal within the range of the comparator 38. If "range hunting" continues until all four amplifiers 32. . . .35 are in maximum gain state the four outputs of binary stages 46. . . .49 are applied with the output of pump circuit 50 to a gate circuit (not shown) which inhibits the application of further pulses to binary stages 46. . . .49. On the other hand, if the applied input signal is at such a level that an unacceptably high voltage is applied to comparator 38, no count at all or only a very small count will be recorded by tenths counter 43. The absence of an acceptably large count permits a reset range control 51 to pass forward a signal from the low frequency multivibrator 40 shortly after the end of the normal counting period to reset the binary stages 46. . . .49. The gain is thus reset to a minimum and if necessary is again increased in steps of 5 db as already described.

In addition to controlling gain of amplifiers 32. . . .35, the binary stages 46. . . .49 also control a tens display 52. Binary stage 46 also controls a "5's discriminator" 53, so that the reset pulse from low frequency multivibrator 40 resets the units counter 44 to within "0" or "5" as required by the range in use. A carry control 54 enables the units counter 44 to advance the tens display 52 by one so that in those cases where the units counter 44 is reset to "5" and receives a total count of six a carry pulse advances the tens display.

It is accepted practice in telecommunications to measure signal levels relative to one milliwatt (Mw). Powers exceeding 1 Mw being expressed as positive levels and powers below 1 Mw being expressed as negative levels. It is generally required in a decibelmeter to cover both positive and negative levels and consequently it is necessary to arrange that the count by counters 43 and 44 may appear to take place as either a forward or backward count at will. In the present instrument this is achieved by arranging that the tenths counter 43 and units counter 44 are made reversible. Control lines for the reversing circuits are provided by a reversing toggle which is principally controlled by a state of binary stages 46. . . .49. In the case of the range which straddles the zero point, this toggle is set initially to the backwards direction and is triggered over to the forward state at the instant at which the counters pass through zero. For the sake of clarity the reversing arrangements have been omitted from FIG. 3.

Figure 4:
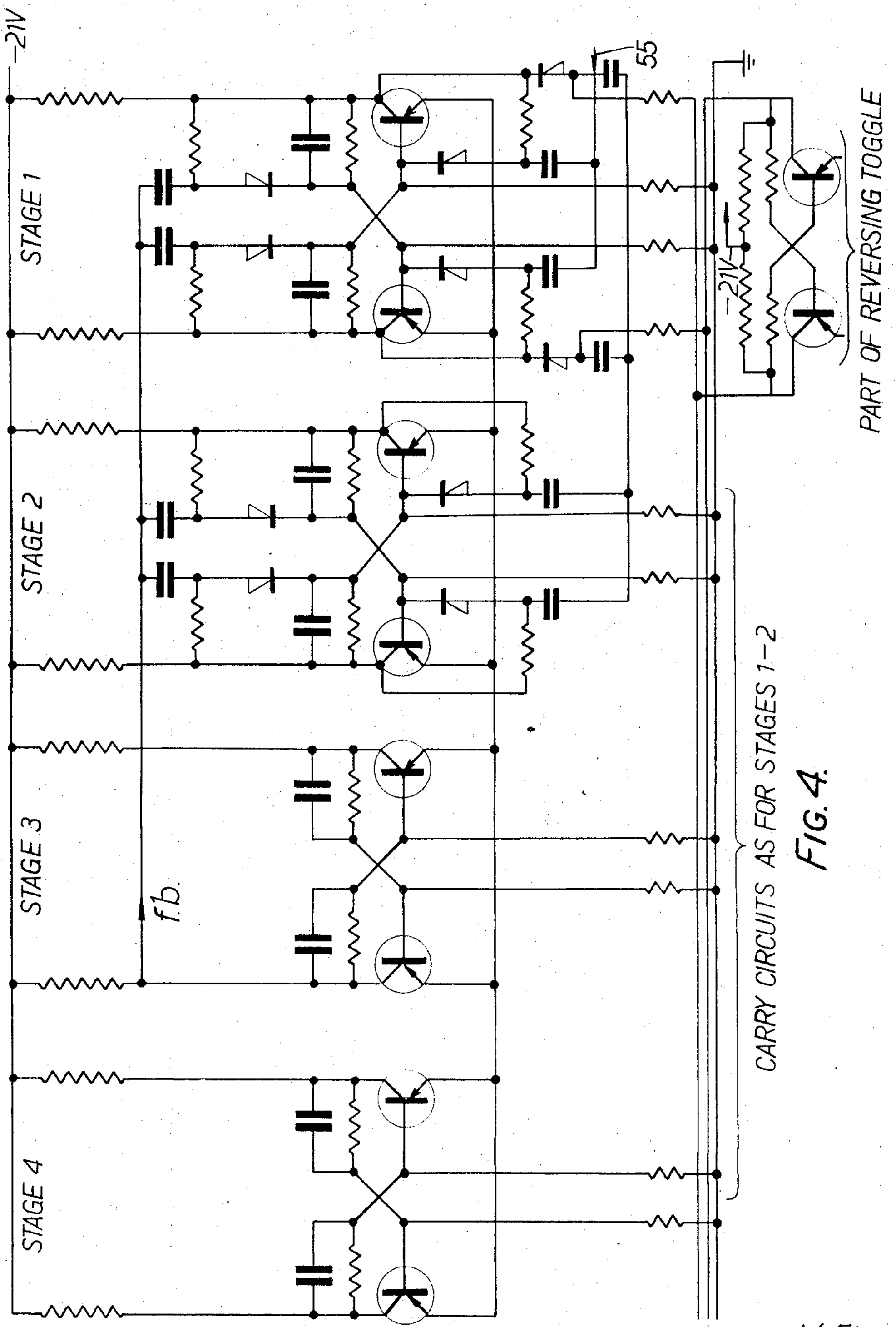
FIG. 4 is a circuit diagram of one part of the embodiment of FIG. 3.

FIG. 4 shows the basic circuit of a decade counter. It consists of four binary stages — providing a scale-of-16 counter — with feedback to cut out six of the sixteen possible combinations. The counter is reversible and the feedback circuits are true in both directions. It will be noted from FIG. 5 that the combinations of the stages for digits "4" and "9" are different in the two directions. The display decoding matrix, part of which is shown in FIG. 10 is arranged to ignore the first and second stages for those digits, discrimination on the third and fourth stages being sufficient to establish the correct display.

In FIG. 4, the carry circuits for stages 3 and 4 have been omitted as they are the same as those shown for stages 1 and 2. Drive to the counter is supplied via lead 55.

The tens counter is similar to the tenths and units counters, but the reversing and feedback components are omitted, giving a straightforward scale-of16 counter. All three counters have reset lines to enable them to be set to zero and the fourth stage of the units counter has an additional connection enabling it to be set to "5" when the range in use so requires.

Figures 6, 7:
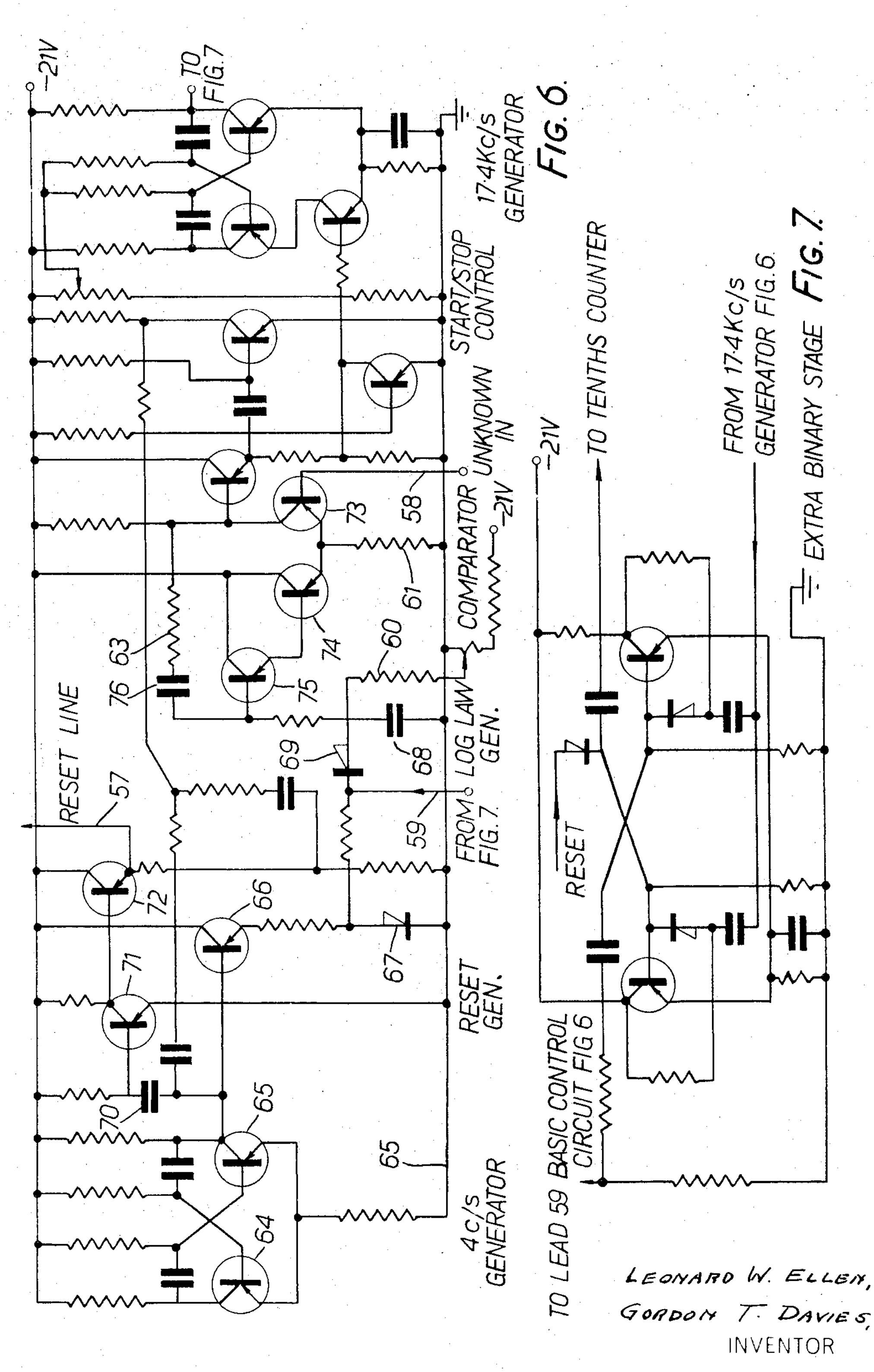
FIG. 6 is a circuit diagram of the basic control system of the embodiment of FIG. 3, FIGS. 7, 8 and 10 are the circuit diagrams of other parts of the embodiment of FIG. 3.

FIG. 6 is the circuit of the basic control of the embodiment of FIG. 3. A multivibrator comprising transistors 64, 65 operating at about 4 c/s provides control and measuring sequence pulses. The output of the multivibrator operates the reset pulse generator comprising transistors 71 and 72 which applies reset pulses over lead 57 (FIGS. 3 and 6). During that part of the cycle for which transistor 65 is "off" the negative potential applies to the emitter follower transistor 66 polarises the zener diode 67 and charges the capacitor 68 to 5.5 volts. Ample time is available for the capacitor to charge fully via the diode 69. When transistor 65 turns on the emitter follower 66 turns off and the capacitor 68 starts to discharge exponentially through resistor 60. At the same time a differentiated pulse via capacitor 70 turns off transistor 71 and generates a short heavy negative pulse at the emitter of transistor 72 which resets the units and tenths counters via lead 57. The 17.4 kc/s oscillator is also turned on and starts to drive the counters as soon as the very short reset pulse ceases.

The voltage on the capacitor 68 is compared with the d.c. voltage derived from the unknown signal on lead 58 by the long-tail transistor pair 73, 74. To ensure that the exponential law is not distorted by the non-linear impedance of transistor 74 a further transistor stage 75 is added to increase the input impedance to a value very high compared with the discharge resistor 60. The potential across the common emitter resistor 61, follows the voltage until it becomes very slightly less than the d.c. potential applied to the base of transistor 74, which then turns on. Positive feedback via resistor 63 and capacitor 76 sharpens the edge of the pulse generated at the collector of transistor 73 and this pulse is used to stop the 17.4 kc/s oscillator. Provided that it is within range, the count is then shown on the units and tenths display. If the signal voltage is too high, transistor 73 remains on throughout the measuring cycle and the 17.4 kc/s oscillator does not start, giving zero count. Small variable resistors enable the exact potential of the earth returns on each side of the comparator to be adjusted slightly to trim the exponential scale shape.

The output on lead 59 (FIG. 3) from the extra binary stage is applied as shown to the exponentially decaying voltage generator to modify slightly the level of the standard applied to the comparator 38.

The calculations set out above indicate that theoretically a generator of 8.7 kc/s is necessary. That frequency is however, doubled because of the interposition between the generator and the chain of counters of the extra binary stage details of which are shown in FIG. 7. This stage can be regarded as measuring half a tenth, i.e. 0.05 db, and is used to change the voltage to which capacitor 68 (FIG. 6) is charged by about 0.01 db thus altering the next measurement by that amount. It is arranged that if a measurement results in the extra binary stopping in the "0" position (say 10,00) the next measurement is biased towards an increased count. If however a measurement results in the extra binary stopping in the "1" position the next measurement is biased towards a decreased count.

Figures 5, 8:
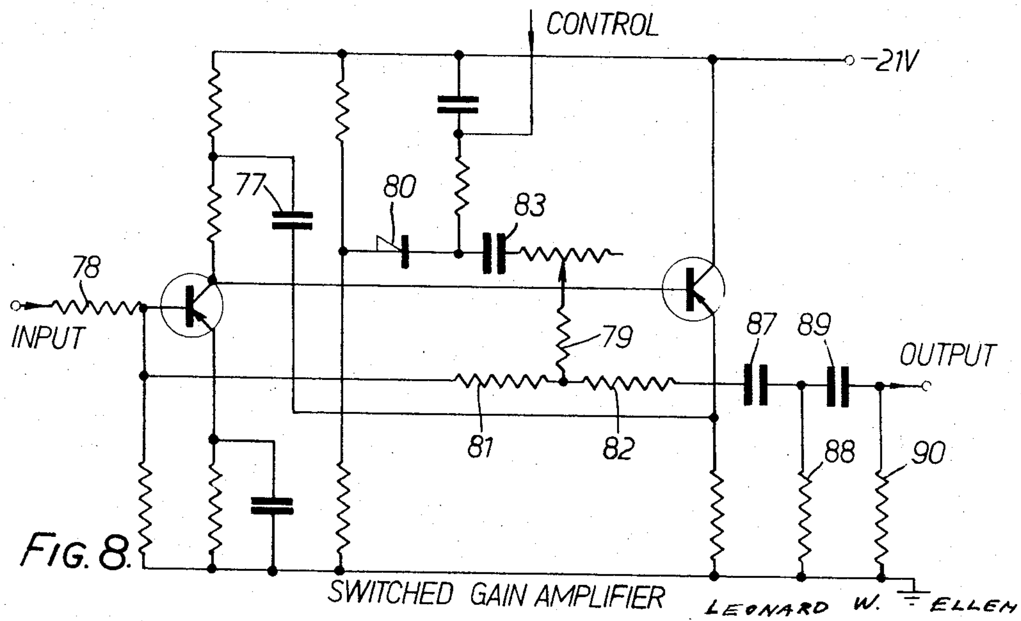
FIG. 5 is an explanatory table of the operation of FIG. 4.

Each switched-gain amplifier, the basic circuit of which is shown in FIG. 8, consists of two transistor stages. The first provides the voltage gain while the second is an emitter follower giving low output impedance without undue loading of the first stage. The "bootstrap" connection of capacitor 77 enables a high gain to be obtained, while negative feedback from output emitter to the input base controls and stabilises the overall gain and d.c. bias points. The input and output impedances are low and are swamped by the coupling resistors 78. Resistor 78 may be regarded as divided into two equal parts; the input and output impedances are then finite and matched. The change of gain is obtained by the connection of resistor 79 and diode 80 to the midpoint of the feedback resistors 81 and 82. The diode 80 may be either forward or backward biased by a control potential from a stage of the tens counter. When forward biased its impedance is low and the feedback signal is partially shunted to earth; the gain of the amplifier is then high. When the diode is backward biased its impedance is high and the feedback is fully effective; the gain of the amplifier is then low. Capacitor 83 isolates the d.c. control potential from the amplifier and the value of resistors 79 and 84 controls the amount of gain variation. Diode 80 is not operated on the curved part of its characteristic, being either fully on or cut off, and non-linear distortion is thus avoided. The 5, 10 and 20 db amplifiers differ only in the value of the components in the feedback networks. The 40 db amplifier consists of two 20 db circuits in cascade, the control line being common to both.

The 20 db circuits require a very low value of resistors 79 and 84 and the reactance of capacitor 83 then seriously degrades the performance at low frequencies unless capacitor 83 is made inconveniently large. The performance can be improved by using a modified circuit, shown in FIG. 9, where a transistor 85 replaces the control diode 80. When this transistor is biased "on" the capacitor 86 on its base is seen at the emitter as if multiplied by the gain of the transistor; thus a 25 $\mu$fd capacitor appears as upwards of 1000 $\mu$fd, while the control line sees it as only 25 $\mu$fd, thus avoiding excessive load on the tens counter. When the transistor is biased "off" its emitter presents virtually an open circuit to the feedback signal.

The method of changing the gain inevitably gives rise to quite large surges during range changing. In FIG. 8, a simple high-pass network capacitor 87, resistor 88, capacitor 89 and resistor 90, between amplifiers materially reduces these surges, but nevertheless voltages exceeding the normal signal voltages reach the signal rectifiers and result in an apparently "high" signal while the overall gain is still too low for the real signal to be measured, thus preventing further gain being switched in until the surges have died away. This merely results in delay in finding the appropriate range, but it is necessary to arrange that the apparent signal due to a surge is not interpreted as a high signal requiring the tens counter to be reset to minimum gain, for this would cause continuous hunting and failure to find the correct range. It is therefore arranged that this reset condition cannot be generated until about two seconds after a range change, allowing ample time for switching surges to dissipate.

The visual display is of known form and part only of the circuit is shown in FIG. 10. The three numerical digits and the + or − sign appear on neon display tubes. These tubes require 170 volts to strike, and extinguish at 100 volts. They can therefore be controlled by transistors capable of handling about 70 volts. The current required is 2mA per digit for a small size display, 4mA for a large display.

FIG. 10 shows the gating and control arrangement. The necessary 170 volts is obtained as a positive supply of 155 volts together with a 15 volts zenered tap from the −21 volts supply serving the amplifiers, counters, etc.. Each numeral is controlled by an n-p-n transistor rated at 70 volts 300 mW. So long as one or more of the binary stages controlling a given numeral are in the "wrong" state the corresponding control transistor 91, 92, 93 is held "off" and the display tube receives only 100 volts. When all the relevant binary stages are simultaneously in the appropriate state an earth is applied via resistors 94, 95 and 96, etc. to the base of the control transistor, which turns "on" and applies the full 170 volts to the appropriate cathode of the display tube.

In addition to the built-in display an extension unit can be provided to switch the display to a remote point. 32 wires are required, and may be multiplied to several display points. Only one point may be used at a time owing to limitations in the display control circuitry, and simple switching of the 155 volts supply avoids violation of this requirement. An attempt to use several displays simultaneously might result in damage to the control transistors.

We claim:

1. A device for determining the value of a quantity and visually displaying the value in digital form, the device comprising in combination, a first counter for counting electric pulses whose number characterises the value, visual display means connected to the counter for displaying in digital form the number of pulses counted by said first counter, a first transmission path of controlled conductivity connected to said first counter, said electric pulses being transmitted along said first path to said first counter, a binary stage having a first and a second input and a first and a second output, said first input being connected to said first transmission path to receive pulses therefrom, said first output being connected to said first counter, a source of equi-time-spaced electric pulses, further counting means connected to said source for counting pulses therefrom, said further counting means being connected to said first transmission path to render the latter non-conducting when said further counting means has reached a predetermined count, a reset control connected to said further counting means and to said second input of said binary stage, and a further transmission path of controlled conductivity interconnecting said reset control and said further counting means, said second output of said binary stage being connected to said further transmission path to control the conductivity thereof.

2. A device for determining the value of a quantity and visually displaying the value in digital form comprising in combination a source of time-spaced pulses, gating means connected to said source to receive said pulses, a single binary counting stage connected to said gating means to receive the output therefrom when said gating means is rendered conducting, said binary counter stage having a first output and a second output, a pulse counter connected to receive the first output of said binary counting stage, visual display apparatus connected only to said pulse counter for displaying in visual form a pulse count achieved by said pulse counter but not the condition of said binary counting stage, means connected to said gating means to switch the state of said gating means from a non-conducting condition to a conducting condition for a time period determined by said value and for returning the state to a non-conducting condition at the end of said time period, said second output being connected to said means to vary slightly said time period in order to hold the displayed pulse count steady.

3. A device as claimed in claim 2 in which the said means comprises comparator means for comparing the value of the quantity with a known value, and in which the single said binary counting stage is connected to said comparator to vary slightly one of the said values in dependence upon the said second output.

4. A device as claimed in claim 2 in which the said means comprises a comparator for varying the value with an exponentially-varying value derived from a resistor-capacitor combination, and which further comprises control means for starting said source when said exponentially-varying value is at its maximum and for stopping said source when said exponentially-varying value equals the value of said quantity.

5. A device as claimed in claim 2 in which said means comprises a comparator for comparing the value of the quantity with a standard level, said device further comprising a series of amplifiers, a plurality of additional binary counting stages each connected to an amplifier of said series, interconnections from said pulse counter to said additional binary counting stages whereby each of the latter is enabled, at a predetermined pulse count to bring into operation the amplifier to which it is connected.

* * * * *